US010769670B2

(12) United States Patent
Heyd et al.

(10) Patent No.: US 10,769,670 B2
(45) Date of Patent: Sep. 8, 2020

(54) RUNTIME MATCHING OF COMPUTING ENTITIES

(71) Applicant: Criteo, SA, Paris (FR)

(72) Inventors: Mathieu Heyd, Paris (FR); Bruno Roggeri, Paris (FR); Ivan Litovsky, Paris (FR)

(73) Assignee: Criteo SA, Paris (FR)

( * ) Notice: Subject to any disclaimer, the term of this patent is extended or adjusted under 35 U.S.C. 154(b) by 843 days.

(21) Appl. No.: 15/239,815

(22) Filed: Aug. 17, 2016

(65) Prior Publication Data
US 2018/0053216 A1    Feb. 22, 2018

(51) Int. Cl.
*G06Q 30/00* (2012.01)
*G06Q 30/02* (2012.01)
*G06K 9/00* (2006.01)

(52) U.S. Cl.
CPC ..... *G06Q 30/0267* (2013.01); *G06K 9/00087* (2013.01); *G06Q 30/0251* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 8,768,766 B2* | 7/2014 | Ellis | G06Q 30/0242 705/14.43 |
| 9,369,779 B2* | 6/2016 | Shkedi | G06Q 30/0241 |
| 10,290,017 B2 | 5/2019 | Traasdahl et al. | |
| 2006/0161553 A1* | 7/2006 | Woo | G06F 16/3344 |
| 2009/0024737 A1 | 1/2009 | Goldspink et al. | |

(Continued)

FOREIGN PATENT DOCUMENTS

| | | | | |
|---|---|---|---|---|
| JP | 2010239402 A | * | 10/2010 | H04M 1/00 |
| JP | 2011141813 A | * | 7/2011 | G08B 21/24 |
| JP | 2016184374 A | * | 10/2016 | G06F 21/32 |

OTHER PUBLICATIONS

Bashir et al. Tracing Information Flows Between Ad Exchanges Using Retargeted Ads. (Jun. 25, 2016). Retrieved online May 20, 2020. https://sajjadium.github.io/files/usenixsec2016retargetedads_paper.pdf (Year: 2016).*

(Continued)

*Primary Examiner* — James A Reagan
(74) *Attorney, Agent, or Firm* — Proskauer Rose LLP

(57) ABSTRACT

Systems and methods for identifying one or more candidate computing entities associated with a first user of a first computing entity are disclosed. A first technical ID associated with the first computing entity and one or more parameters associated with the first computing entity are received by the ad system. A first identity fingerprint for the first computing entity is determined by the ad system. One or more candidate computing entities are identified by the ad system based on a similarity between the first identity fingerprint and an associated identity fingerprint of the one or more associated identity fingerprints of the candidate computing entity. First behavioral data is determined by the ad system based on the associated behavioral data of one or more of the one or more candidate computing entities. An advertisement based on the first behavioral data is provided by the ad system.

11 Claims, 4 Drawing Sheets

(56) References Cited

U.S. PATENT DOCUMENTS

| | | |
|---|---|---|
| 2009/0172091 A1 | 7/2009 | Hamel |
| 2010/0094704 A1 | 4/2010 | Subramanian et al. |
| 2011/0125595 A1 | 5/2011 | Neal et al. |
| 2011/0185016 A1 | 7/2011 | Kandasamy et al. |
| 2011/0225637 A1 | 9/2011 | Counterman |
| 2012/0022942 A1 | 1/2012 | Holloway et al. |
| 2012/0023547 A1 | 1/2012 | Maxson et al. |
| 2012/0297062 A1 | 11/2012 | Lu et al. |
| 2013/0145022 A1 | 6/2013 | Srivastava et al. |
| 2013/0159413 A1* | 6/2013 | Davis .............. H04L 63/02 709/204 |
| 2013/0275195 A1 | 10/2013 | Gabryelski et al. |
| 2013/0339139 A1 | 12/2013 | Meyers et al. |
| 2014/0019542 A1* | 1/2014 | Rao .............. G06Q 30/0269 709/204 |
| 2014/0164111 A1 | 6/2014 | Rodriguez et al. |
| 2014/0223462 A1 | 8/2014 | Aimone et al. |
| 2014/0316902 A1 | 10/2014 | Le Jouan |
| 2014/0365304 A1 | 12/2014 | Showers et al. |
| 2015/0051968 A1 | 2/2015 | Sotelo et al. |
| 2015/0052217 A1 | 2/2015 | Benguerah et al. |
| 2015/0058141 A1 | 2/2015 | Yablonka et al. |
| 2015/0082345 A1 | 3/2015 | Archer et al. |
| 2015/0134459 A1 | 5/2015 | Dipaola |
| 2015/0154650 A1 | 6/2015 | Umeda |
| 2015/0180829 A1 | 6/2015 | Yu |
| 2015/0181311 A1 | 6/2015 | Navin et al. |
| 2015/0235275 A1 | 8/2015 | Shah et al. |
| 2015/0324857 A1 | 11/2015 | Siegel et al. |
| 2015/0370814 A1 | 12/2015 | Liodden et al. |
| 2015/0379554 A1 | 12/2015 | Copeland |
| 2016/0080790 A1* | 3/2016 | Shkedi .............. H04N 21/4316 725/14 |
| 2016/0098785 A1 | 4/2016 | Ishida |
| 2016/0125471 A1 | 5/2016 | Hsu et al. |
| 2016/0182657 A1 | 6/2016 | Mukherjee et al. |
| 2016/0234203 A1 | 8/2016 | Gatto et al. |
| 2017/0085522 A1 | 3/2017 | Greene |
| 2017/0154366 A1 | 6/2017 | Turgeman |
| 2017/0180797 A1 | 6/2017 | Splaine et al. |
| 2017/0318008 A1* | 11/2017 | Mead .............. G06F 21/46 |
| 2017/0337588 A1 | 11/2017 | Chittilappilly et al. |
| 2017/0359337 A1 | 12/2017 | Benguerah et al. |
| 2018/0227387 A1 | 8/2018 | Gersons et al. |
| 2018/0351835 A1 | 12/2018 | Williams et al. |

OTHER PUBLICATIONS

Kate Mathews-Hunt. CookieConsumer: Tracking Online Behavioural Advertising in Australia. (Jun. 1, 2016). Retrieved online May 20, 2020. https://www.ftc.gov/system/files/documents/public_comments/2016/05/00005-128081_0.pdf (Year: 2016).*

Cybage. Mobile Device Fingerprinting and Unique User Identification. (Apr. 1, 2016). Retrieved online May 20, 2020. https://www.cybage.com/sites/default/files/whitepaper/2016-03/Mobile%20Device%20Fingerprinting%20and%20Unique%20User%20Identification.pdf (Year: 2016).*

* cited by examiner

RUNTIME MATCHING OF COMPUTING ENTITIES

FIELD OF THE TECHNOLOGY

The present technology relates to matching computing entities, and, more particularly, to identifying one or more other computing entities associated with a user of a computing entity.

BACKGROUND

Users can use a variety of devices, such as PCs, tablets, mobile phones, and other computing devices (generally, computing entities) to consume and/or interact with online content. Further, users can use separate browsers or applications on the same device or different devices to consume and/or interact with online content. Each device, browser, and/or application can have its own technical identifier. For example, IOS devices can utilize an Identifier for Advertisers ("IDFA") or ANDROID devices can utilize an Advertising ID. Browsers can utilize other identifiers, many of which can be stored in cookies. Ad systems can collect behavioral data based on a computing entity's interactions with websites and other online content. Because each device, browser, and/or application can have its own technical identifier, determining whether a particular computing entity is associated with a known user can be difficult. Further, being unable to efficiently determine whether the computing entity is associated with a known user can impede leveraging any behavioral data already possessed for that user (e.g., based on the activity of other computing entities).

SUMMARY

Accordingly, there is a need for technology to facilitate runtime identification of the computing devices used by the same user. In one aspect, there is a method performed by an ad system for identifying one or more candidate computing entities associated with a first user of a first computing entity. The method can include maintaining, by the ad system, for each known computing entity of a plurality of known computing entities, one or more associated identity fingerprints, an associated technical ID, and associated behavioral data. The method can include receiving, by the ad system, a first technical ID associated with the first computing entity and one or more parameters associated with the first computing entity. The method can include determining, by the ad system, a first identity fingerprint for the first computing entity based on at least a portion of the one or more parameters, where the portion of the one or more parameters does not uniquely identify the first computing entity. The method can include identifying, by the ad system, the one or more candidate computing entities from the plurality of known computing entities, each candidate computing entity of the one or more candidate computing entities identified based on a similarity between the first identity fingerprint and an associated identity fingerprint of the one or more associated identity fingerprints of the candidate computing entity, where each candidate computing entity of the one or more candidate computing entities is a different computing entity than the first computing entity. The method can include determining, by the ad system, first behavioral data based on the associated behavioral data of one or more of the one or more candidate computing entities. The method can include determining, by the ad system, an advertisement based on the first behavioral data. The method can include providing, by the ad system, the advertisement to the first computing entity.

In some embodiments, the method can include determining, by the ad system, the ad system does not store second behavioral data associated with the first technical ID. In some embodiments, the one or more parameters associated with the first computing entity are indicative of the user of the first computing entity. In some embodiments, determining, by the ad system, the first behavioral data based on the associated behavioral data of one or more of the one or more candidate computing entities can include determining, by the ad system, the associated behavioral data of one of the one or more candidate computing entities. In some embodiments, determining, by the ad system, the first behavioral data based on the associated behavioral data of one or more of the one or more candidate computing entities can include determining, by the ad system, the associated behavioral data of more than one of the one or more candidate computing entities. In some embodiments, the one or more parameters associated with the first computing entity include a first portion of a first IP address of the first computing entity, and determining, by the ad system, the first identity fingerprint for the first computing entity based on the at least a portion of the one or more parameters can include setting, by the ad system, the first identity fingerprint based on at least the first portion of the first IP address.

In some embodiments, the one or more parameters associated with the first computing entity include a first portion of a first IP address of the first computing entity and user agent data from the first computing entity, and determining, by the ad system, the first identity fingerprint for the first computing entity based on the at least a portion of the one or more parameters can include setting, by the ad system, the first identity fingerprint based on at least the first portion of the first IP address and a device model identifier from the user agent data. In some embodiments, maintaining, by the ad system, for each known computing entity of the plurality of known computing entities, the one or more associated identity fingerprints, the associated technical ID, and the associated behavior data can include associating, by the ad system, an associated identity fingerprint with a known computing entity only if no other known computing entity of the plurality of known computing entities has a matching identity fingerprint that matches the associated identity fingerprint. In some embodiments, maintaining, by the ad system, for each known computing entity of the plurality of known computing entities, the one or more associated identity fingerprints, the associated technical ID, and the associated behavior data can include associating, by the ad system, an associated identity fingerprint with a known computing entity only if a number of other known computing entities of the plurality of known computing entities having a matching identity fingerprint that matches the associated identity fingerprint is less than a pre-determined number.

In another aspect, there is a method performed by an ad system for identifying one or more candidate computing entities associated with a first user of a first computing entity. The method can include maintaining, by the ad system, for each known computing entity of a plurality of known computing entities, one or more associated identity fingerprints, an associated technical ID, and associated behavioral data. The method can include receiving, by the ad system, a first technical ID associated with the first computing entity and first one or more parameters associated with the first computing entity. The method can include determining, by the ad system, a first identity fingerprint for the first computing entity based on at least a portion of the first one or more parameters, where the portion of the first one or more parameters does not uniquely identify the first computing entity. The method can include identifying, by the ad system, the one or more candidate computing entities from the plurality of known computing entities, each candidate computing entity of the one or more candidate computing entities identified based on a similarity between the first identity fingerprint and an associated identity fingerprint of the one or more associated identity fingerprints of the candidate computing entity, where each candidate computing entity of the one or more candidate computing entities is a different computing entity than the first computing entity. The method can include determining, by the ad system, first behavioral data based on the associated behavioral data of one or more of the one or more candidate computing entities. The method can include determining, by the ad system, a bid amount for an ad display opportunity on the first computing entity based at least in part on the first behavioral data. The method can include receiving, by the ad system, second one or more parameters associated with the first computing entity in connection with providing, by the ad system, an advertisement for display in the ad display opportunity. The method can include storing, by the ad system, the second one or more parameters.

In some embodiments, the first one or more parameters include a first portion of a first IP address of the first computing entity, the first portion being less than all of the first IP address, and the second one or more parameters include all of the first IP address of the first computing entity. In some embodiments, the method can include increasing, by the ad system, the bid amount based at least in part on a determination, by the ad system, that the ad system does not store the second one or more parameters associated with the first computing entity. In some embodiments, the method can include increasing, by the ad system, the bid amount based at least in part on a determination, by the ad system, that the ad system does not store all of a first IP address of the first computing entity. In some embodiments, the method can include increasing, by the ad system, the bid amount based at least in part on a determination, by the ad system, that the ad system does not store all of first user agent data of the first computing entity.

In another aspect, there is a method performed by an ad system. The method can include maintaining, by the ad system, for each known computing entity of a plurality of known computing entities, one or more associated identity fingerprints, an associated technical ID, and associated behavioral data. The method can include receiving, by the ad system, a first technical ID associated with a first computing entity and first one or more parameters associated with the first computing entity. The method can include determining, by the ad system, a first identity fingerprint for the first computing entity based on at least a portion of the first one or more parameters, wherein the portion of the first one or more parameters does not uniquely identify the first computing entity. The method can include determining, by the ad system, a bid amount for an ad display opportunity on the first computing entity in response to determining that none of the plurality of known computing entities has an associated identity fingerprint matching the first identity fingerprint. The method can include receiving, by the ad system, second one or more parameters associated with the first computing entity in connection with providing, by the ad system, an advertisement for display in the ad display opportunity. The method can include storing, by the ad system, the second one or more parameters.

In some embodiments, the first one or more parameters include a first portion of a first IP address of the first computing entity, the first portion being less than all of the first IP address, and the second one or more parameters include all of the first IP address of the first computing entity. In some embodiments, the method can include increasing, by the ad system, the bid amount based at least in part on a determination, by the ad system, that the ad system does not store the second one or more parameters associated with the first computing entity. In some embodiments, the method can include increasing, by the ad system, the bid amount based at least in part on a determination, by the ad system, that the ad system does not store all of a first IP address of the first computing entity. In some embodiments, the method can include increasing, by the ad system, the bid amount based at least in part on a determination, by the ad system, that the ad system does not store all of first user agent data of the first computing entity.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

Environment and Systems

Figure 1:
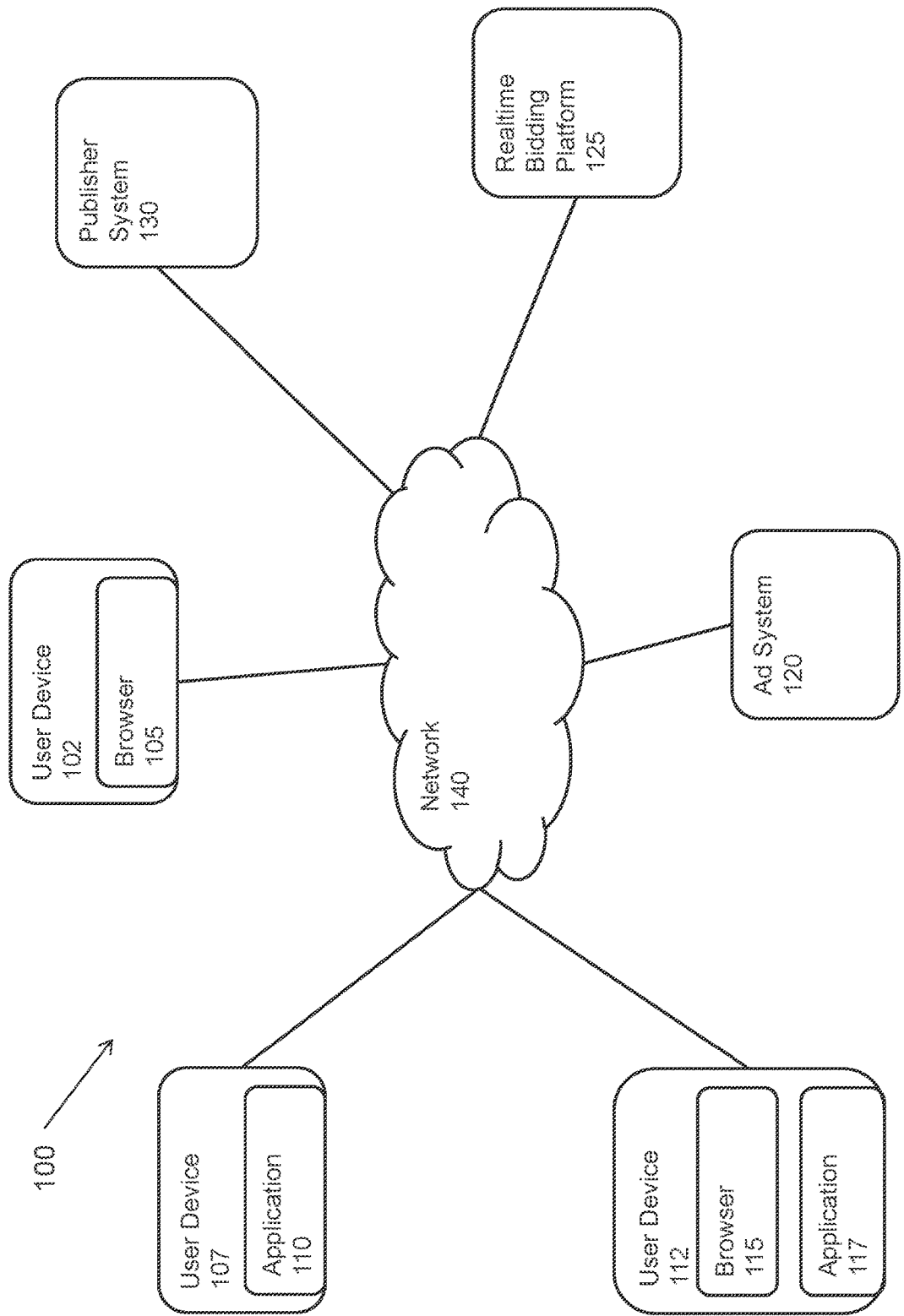
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, user device 112, ad system 120, realtime bidding ("RTB") platform 125, and publisher system 130. User device 102, user device 107, user device 112, ad system 120, RTB platform 125, and publisher system 130 can be in data communication via network 140. User devices 102, 107, and 112 can each be any computing devices. In some embodiments, user devices 102, 107, and 112 can each be one of a mobile computing device (e.g., cellular phones and/or tablets), a PC, or other computing device. User device 102 executes web browser 105. User device 107 executes application 110 (e.g., a mobile app that interacts with online content). User device 112 executes web browser 115 and application 117.

Ad system 120 can be any computing device, such as a server or multiple servers. In some embodiments, ad system 120 can collect behavioral data for a plurality of devices, browsers, and/or applications. In some embodiments, ad system 120 can receive behavioral data for a plurality of devices, browsers, and/or applications from third-parties. In some embodiments, ad system 120 can determine two or more devices, browsers, and/or applications are likely used by the same user in accordance with the present technology.

RTB platform 125 can be any computing device, such as a server or multiple servers. In some embodiments, RTB platform 125 can perform auctions for advertising display opportunities in online media, such as webpages or application content served by publisher system 130, that are provided to user devices 102, 107, or 112. Ad system 120 can submit bids for such advertising opportunities, and if ad system 120 wins the auction, ad system 120 can provide an advertisement to fill the advertising display opportunity. Publisher system 130 can be any computing device, such as a server or multiple servers. In some embodiments, publisher system 130 can serve webpages to browsers 105 and 115. In some embodiments, publisher system 130 can serve other content to applications 110 and 117. In some embodiments, publisher system 130 can communicate with ad system 120 to determine whether ad system 120 will provide an advertisement to fill an advertisement display opportunity in a webpage or application content. Network 140 can be any network or multiple networks. For example, network 140 can include cellular networks through which user devices 102, 107, and 112 are connected and the Internet.

Identifying Computing Entities Associated with a User of a Computing Entity

The present technology can facilitate identifying other computing entities associated with a user of a computing entity. In some embodiments, a computing entity can have an associated technical ID. A technical ID can be, for example, an IDFA, an ANDROID Advertising ID, or other identifier stored in a browser cookie. An ad system can maintain behavioral data for computing entities by associating behavioral data with technical IDs. Behavioral data can be based on a computing entity's interactions (e.g., views, clicks, purchases, etc.) with websites and other online content. Because each computing entity can have its own technical ID, an ad system may not have sufficient information to determine that separate computing entities (e.g., each with its own technical ID) are associated with or used by the same user.

In accordance with the technology, an ad system can maintain for a known computing entity (e.g., computing entity for which it stores behavioral data) one or more associated identity fingerprints, along with the computing entity's technical ID. An identity fingerprint can be a value determined by the ad system based on parameters associated with the computing identity, such as portions of the computing entity's IP address, User Agent data, or other identifying information. In accordance with the technology, the ad system can determine the identity fingerprint in a manner such that the identity fingerprint is not expected to uniquely identify only one computing entity. The ad system can determine the identity in a manner such that computing entities used by the same user can have the same identity fingerprint. For example, the identity fingerprint can be the first three bytes of an IPv4 IP address of a computing entity. As another example, an identity fingerprint can be the first three bytes of an IPv4 IP address and a Device Model value from the User Agent data. Beneficially, such identity fingerprints can be the same for multiple computing entities associated with the same user, such as a browser and an application running on the same mobile computing device. It should be appreciated that an identity fingerprint can be based on other information. For example, an identity fingerprint can be based on a portion of an IPv6 IP address and/or other values from the User Agent data. In some embodiments, an ad system can determine one or more identity fingerprints for some or all known computing entities in an offline process.

In some embodiments, the ad system can associate an identity fingerprint with a known computing entity only if no other known computing entity has a matching identity fingerprint. In some embodiments, the ad system can associate an identity fingerprint with a known computing entity only if less than a pre-determined number of other known computing entities have a matching identity fingerprint. Beneficially, these approaches can prevent the ad system from maintaining fingerprints that are too common to be useful in identifying computing entities likely to be used by the same user.

Figure 2:
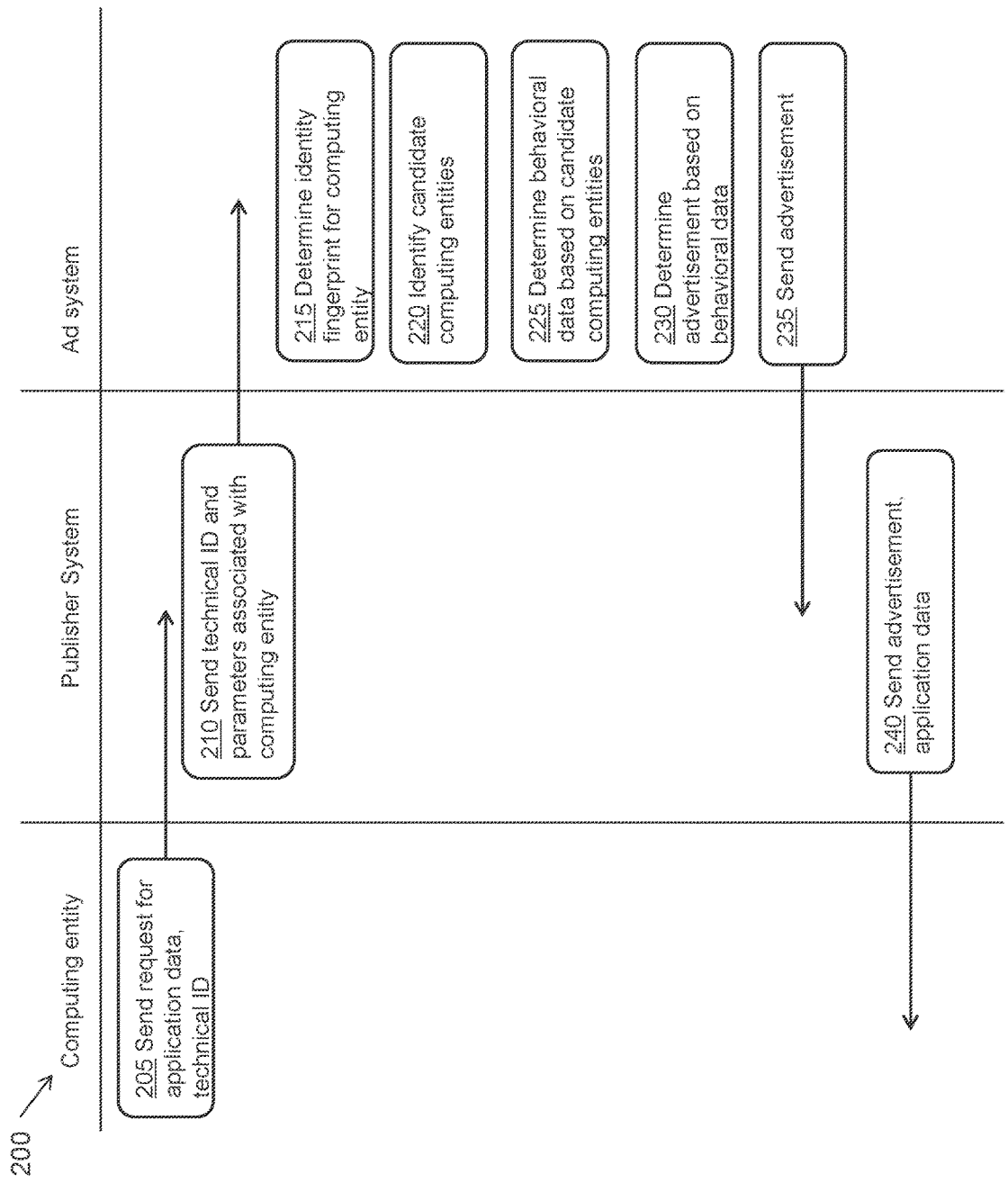
FIG. 2 depicts a flow chart of a method for determining other computing entities likely to be associated with a user of a computing entity.

FIG. 2 depicts flow chart 200 of a method for determining other computing entities likely to be associated with a user of a computing entity. At step 205, a first computing entity sends a request for application data and its technical ID to a publisher system. For example, application 117 can send a request for application data and/or advertisements to publisher system 130. At step 210, the publisher system can send the first computing entity's technical ID and parameters associated with the first computing entity to an ad system. For example, publisher system 130 can send the technical ID for application 117 and parameters associated with application 117 and/or user device 112 to ad system 120. In some embodiments, the parameters can include, for example, a portion of an IP address for user device 112. In some embodiments, the parameters can include, for example, a portion of an IP address and one or more fields of the User Agent data for user device 112.

At step 215, the ad system can determine a first identity fingerprint for the first computing entity based on the received parameters associated with the first computing entity. For example, the identity fingerprint can be the first three bytes of an IPv4 IP address of the first computing entity or the first three bytes of an IPv4 IP address and a Device Model value from the User Agent data for the first computing entity, depending on information provided by the publisher system. The ad system can determine the first identity fingerprint for the first computing entity in a manner such that other computing entities used by the user of the first computing entity can have the same identity fingerprint. In some embodiments, the ad system can determine the first identity fingerprint and perform the remainder of the method illustrated in FIG. 2 only if the ad system determines the ad system does not store behavioral data associated with the technical ID for the first computing entity.

At step 220, the ad system can identify candidate computing entities that can be associated with the user of the first computing device. In some embodiments, the ad system can search the information it maintains for other computing entities, as described above, to identity the candidate computing entities. For example, the ad system can identify one or more candidate computing entities (e.g., those computing entities for which the ad system stores behavioral data) that have identity fingerprints that match the first identity fingerprint of the first computing entity. Beneficially, in some embodiments, the ad system can determine the identity fingerprint for the computing entities for which the ad system stores behavioral data in an offline process so that only the first identity fingerprint for the first user device is determined at runtime.

At step 225, the ad system can determine behavioral data based on the candidate computing entities. For example, the ad system can retrieve the stored behavioral data associated with each of the candidate computing entities. In some embodiments, the ad system can determine the behavioral data using the associated behavioral data of one of the candidate computing entities. In some embodiments, the ad system can determine the behavioral data using the associated behavioral data of more than one of the candidate computing entities. At step 230, the ad system can determine an advertisement based on the behavioral data. At step 235, the ad system can send the advertisement to the publisher system, and at step 240, the publisher system can send the advertisement and other application data to the first computing entity.

Figure 3A:
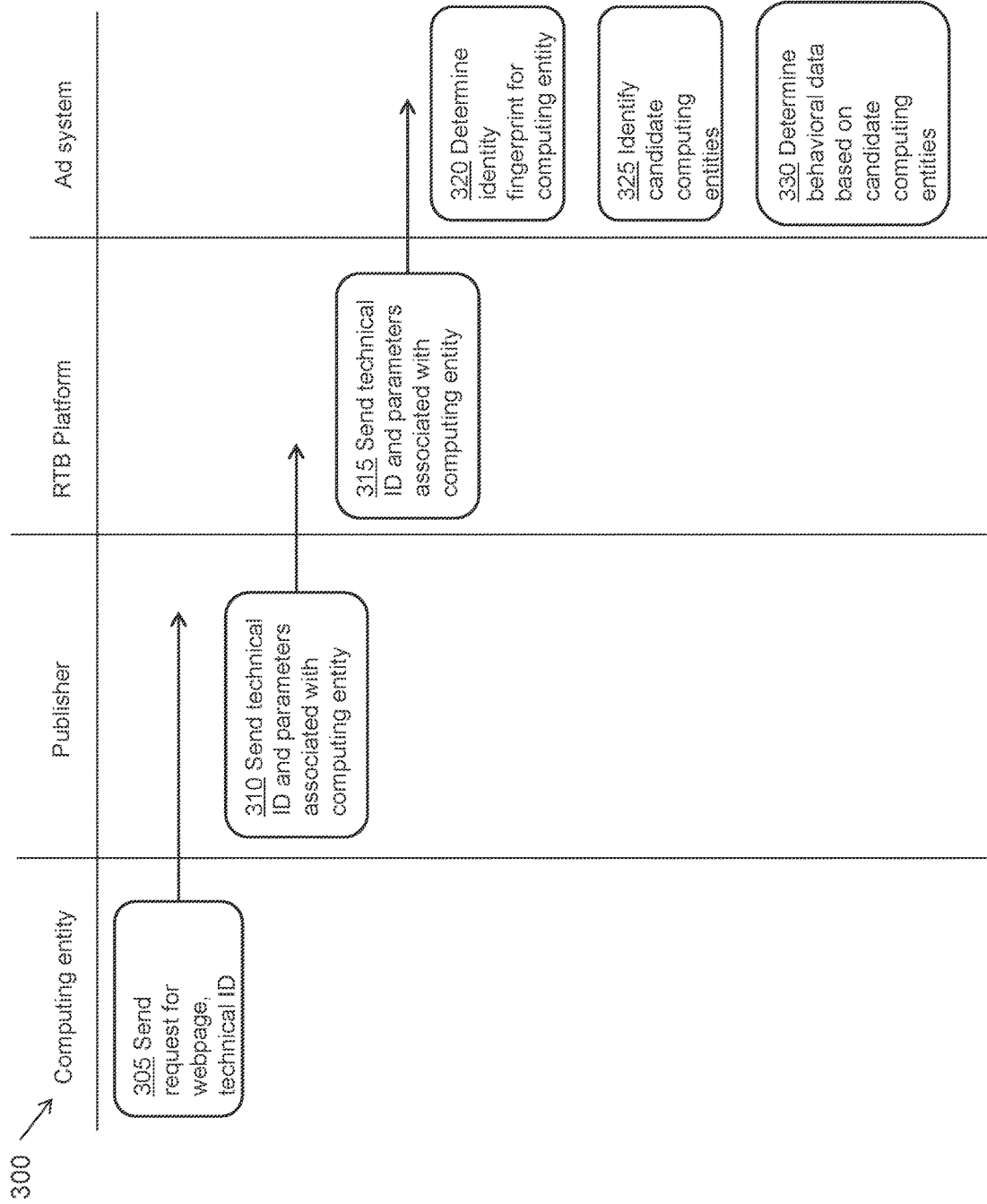
FIGS. 3A and 3B depict a flow chart of a method for determining other computing entities likely to be associated with a user of a computing entity.
Figure 3B:
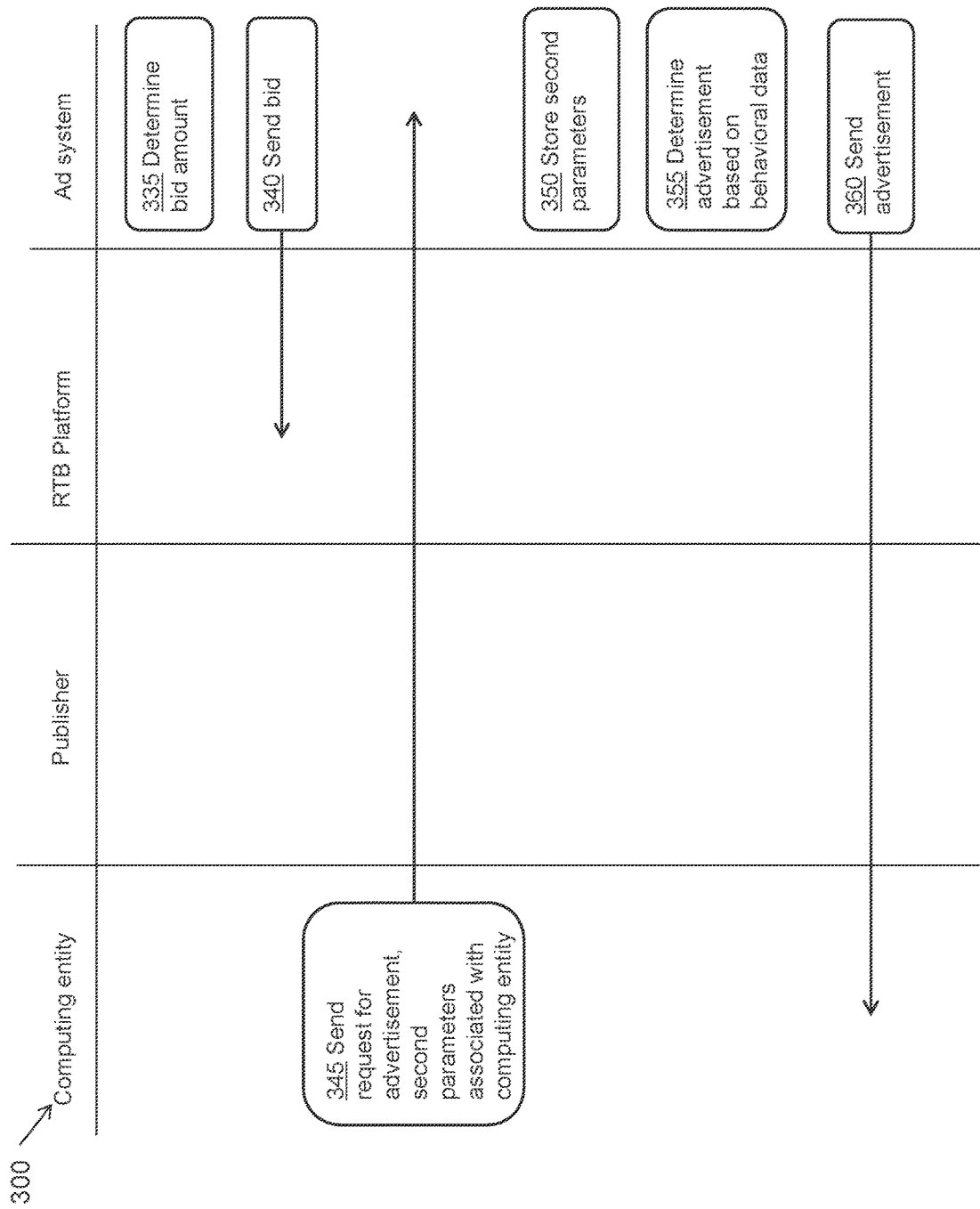

FIGS. 3A and 3B depict flow chart 300 of a method for determining other computing entities likely to be associated with a user of a computing entity. At step 305, a first computing entity sends a request for a webpage to a publisher. In the illustrated example, the webpage can include spaces for advertising, such as spaces for banner ads (e.g., generally, ad display opportunities). At step 310, the publisher can send the technical ID and first parameters associated with the first computing entity to an RTB platform so that the RTB platform can perform one or more auctions for the ad display opportunities. At step 315, the RTB platform can send the first computing entity's technical ID and parameters associated with the first computing entity to an ad system (e.g., to solicit a bid for an ad display opportunity on the webpage).

At step 320, the ad system can determine a first identity fingerprint for the first computing entity based on the received parameters associated with the first computing entity. For example, the ad system can determine the first identity fingerprint in any of the manners described with respect to FIG. 2. At step 325, the ad system can identify candidate computing entities that can be associated with the user of the first computing device, for example, as described with respect to FIG. 2. At step 330, the ad system can determine behavioral data based on the candidate computing entities, for example, as described with respect to FIG. 2. At step 335, the ad system can determine a bid amount for the ad display opportunity based on the behavioral data, and, at step 345, send the bid to the RTB platform. In some embodiments, the ad system can increase the bid amount based on determining that the ad system does not currently store all of the IP address of the first computing entity. In some embodiments, the ad system can increase the bid amount based on determining that the ad system does not currently store all of the User Agent data of the first computing entity.

In some embodiments, if no candidate computing entities are identified at step 330, the ad system can determine a bid amount for the ad display opportunity based on determining that none of the plurality of known computing entities has an associated identity fingerprint matching the first identity fingerprint. In some embodiments, the ad system can increase the bid amount based on determining that the ad system does not currently store all of the IP address of the first computing entity. In some embodiments, the ad system can increase the bid amount based on determining that the ad system does not currently store all of the User Agent data of the first computing entity.

If the ad system wins the auction, at step 345, the first computing entity can send a request for an advertisement to the ad system. In some embodiments, the request can include second parameters associated with the computing entity. For example, the parameters can include a full IP address for the computing entity and/or complete User Agent data for the computing entity. At step 350, the ad system can store the second parameters. Beneficially, the second parameters can provide the ad system with additional information about the first computing device (e.g., information not provided in the first parameters). At step 355, the ad system can determine the advertisement based on the behavioral data, if any is available. In some embodiments, the ad system can determine the advertisement, or certain aspects thereof such as the campaign, the products and/or layout for the advertisement, at the time the bid is determined. At step 360, the ad system can send the advertisement to the computing entity.

It should be appreciated that other implementations are contemplated in accordance with the present technology. For example, in some embodiments, a publisher system or a computing entity of a user can communicate with the ad system directly, permitting the ad system to determine whether the ad system will provide an advertisement for an ad display opportunity. In some embodiments, the ad system can provide the advertisement to an intermediary system that can then provide the advertisement to the computing entity of the user.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method for identifying one or more candidate computing entities associated with a first user of a first computing entity, the method comprising:
maintaining, by an ad system, for each known computing entity of a plurality of known computing entities, one or more associated identity fingerprints, an associated technical ID, and associated behavioral data, including, for each known computing entity:
capturing the associated technical ID and the associated behavioral data for the known computing entity using one or more interactions initiated from the known computing entity with one or more websites associated with a publisher system;
determining an associated identity fingerprint for the known computing entity based upon at least a portion of an IP address of the known computing entity and user agent data for the known computing entity,
identifying a number of other known computing entities which have an associated identity fingerprint that matches the determined identity fingerprint for the known computing entity, and
associating the determined identity fingerprint with the known computing entity when the number of other known computing entities is less than a predetermined number;
receiving, by the publisher system, a request for application data and a first technical ID from the first computing entity, the request for application data comprising a first IP address of the first computing entity and user agent data of the first computing entity, wherein the first technical ID is stored in a cookie on the first computing entity;

receiving, by the ad system from the publisher system, the first technical ID associated with the first computing entity, a portion of the first IP address of the first computing entity, and a device model value from the user agent data for the first computing entity, wherein the portion of the first IP address and the device model value in combination do not uniquely identify the first computing entity;

determining, by the ad system, a first identity fingerprint for the first computing entity based on the portion of the first IP address of the first computing entity and the device model value from the user agent data for the first computing entity;

identifying, by the ad system, one or more candidate computing entities from the plurality of known computing entities, each candidate computing entity of the one or more candidate computing entities identified based on a similarity between the first identity fingerprint and an associated identity fingerprint of the one or more associated identity fingerprints of the candidate computing entity, wherein each candidate computing entity of the one or more candidate computing entities is a different computing entity than the first computing entity;

determining, by the ad system, first behavioral data based on the associated behavioral data of one or more of the one or more candidate computing entities;

determining, by the ad system, an advertisement based on the first behavioral data; and providing, by the ad system, the advertisement to the first computing entity.

2. The method of claim 1, further comprising determining, by the ad system, the ad system does not store second behavioral data associated with the first technical ID.

3. The method of claim 1, wherein determining, by the ad system, the first behavioral data based on the associated behavioral data of one or more of the one or more candidate computing entities comprises:
 determining, by the ad system, the associated behavioral data of one of the one or more candidate computing entities.

4. The method of claim 1, wherein determining, by the ad system, the first behavioral data based on the associated behavioral data of one or more of the one or more candidate computing entities comprises:
 determining, by the ad system, the associated behavioral data of more than one of the one or more candidate computing entities.

5. The method of claim 1, wherein maintaining, by the ad system, for each known computing entity of the plurality of known computing entities, the one or more associated identity fingerprints, the associated technical ID, and the associated behavior data comprises:
 associating, by the ad system, an associated identity fingerprint with a known computing entity only when the number of other known computing entities which have an associated identity fingerprint that matches the determined identity fingerprint for the known computing entity is zero.

6. The method of claim 1, wherein the first IP address is an IPv4 IP address.

7. The method of claim 6, wherein the portion of the first IP address of the first computing entity comprises the first three bytes of the IPv4 IP address.

8. The method of claim 1, wherein the first technical ID comprises an Identifier for Advertisers ("IDFA") or an ANDROID™ Advertising ID.

9. The method of claim 1, wherein the ad system determines the associated identity fingerprint for the known computing entities in an offline process.

10. A method for identifying one or more candidate computing entities associated with a first user of a first computing entity, the method comprising:
 maintaining, by an ad system, for each known computing entity of a plurality of known computing entities, one or more associated identity fingerprints, an associated technical ID, and associated behavioral data, including, for each known computing entity:
  capturing the associated technical ID and the associated behavioral data for the known computing entity using one or more interactions initiated from the known computing entity with one or more websites associated with a publisher system;
  determining an associated identity fingerprint for the known computing entity based upon at least a portion of an IP address of the known computing entity and user agent data for the known computing entity,
  identifying a number of other known computing entities which have an associated identity fingerprint that matches the determined identity fingerprint for the known computing entity, and
  associating the determined identity fingerprint with the known computing entity when the number of other known computing entities is less than a predetermined number;
 receiving, by the publisher system, a request for application data and a first technical ID from the first computing entity, the request for application data comprising a first IP address of the first computing entity and user agent data of the first computing entity, wherein the first technical ID is stored in a cookie on the first computing entity;
 receiving, by the ad system from the publisher system, the first technical ID associated with the first computing entity, a portion of the first IP address of the first computing entity, and a device model value from the user agent data for the first computing entity, wherein the portion of the first IP address and the device model value in combination do not uniquely identify the first computing entity;
 determining, by the ad system, a first identity fingerprint for the first computing entity based on the portion of the first IP address of the first computing entity and the device model value from the user agent data for the first computing entity;
 identifying, by the ad system, one or more candidate computing entities from the plurality of known computing entities, each candidate computing entity of the one or more candidate computing entities identified based on a similarity between the first identity fingerprint and an associated identity fingerprint of the one or more associated identity fingerprints of the candidate computing entity, wherein each candidate computing entity of the one or more candidate computing entities is a different computing entity than the first computing entity;

determining, by the ad system, first behavioral data based on the associated behavioral data of one or more of the one or more candidate computing entities;

determining, by the ad system, a bid amount for an ad display opportunity on the first computing entity based at least in part on the first behavioral data;

transmitting, by the ad system, a bid for the ad display opportunity to a realtime bidding platform, the bid including the bid amount;

receiving, by the ad system, an indication from the realtime bidding platform that the bid is accepted;

receiving, by the ad system, a request for an advertisement to be placed in the ad display opportunity from the first computing entity, the request including the full first IP address associated with the first computing entity and the complete first user agent data for the first computing entity;

storing, by the ad system, the full first IP address associated with the first computing entity and the complete first user agent data for the first computing entity; and transmitting, by the ad system, the advertisement to the first computing entity for display.

11. The method of claim 10, further comprising increasing, by the ad system, the bid amount based at least in part on a determination, by the ad system, that the ad system does not store the full first IP address associated with the first computing entity, the complete first user agent data for the first computing entity, or both.

* * * * *